United States Patent
Toda et al.

(10) Patent No.: US 6,349,251 B1
(45) Date of Patent: *Feb. 19, 2002

(54) AUTOMATIC AUTOMOBILE HEADLAMP LEVELING DEVICE

(75) Inventors: Atsushi Toda; Hideaki Takeuchi, both of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/502,318

(22) Filed: Feb. 11, 2000

(30) Foreign Application Priority Data

Feb. 15, 1999 (JP) .......................................... 11-035791

(51) Int. Cl.$^7$ ................................................ G06F 7/00
(52) U.S. Cl. .......................... 701/49; 701/36; 362/460; 362/465; 315/82; 340/468; 307/10.8
(58) Field of Search .................... 701/49, 36; 362/465, 362/459, 460, 466, 40, 525, 532, 464; 315/360, 82, 363, 77; 340/469, 939, 457.2, 468, 458; 307/10.8, 9.1, 10.1

(56) References Cited

U.S. PATENT DOCUMENTS

| | | | | |
|---|---|---|---|---|
| 5,193,905 A | * | 3/1993 | Edwards et al. | 362/425 |
| 5,877,680 A | * | 3/1999 | Okuchi et al. | 340/468 |
| 5,907,196 A | | 5/1999 | Hayami et al. | 307/10.8 |
| 5,923,125 A | * | 7/1999 | Endo | 315/82 |
| 5,962,980 A | * | 10/1999 | Kluge et al. | 315/82 |
| 6,049,171 A | * | 4/2000 | Stam et al. | 315/82 |
| 6,183,118 B1 | * | 2/2001 | Toda et al. | 362/465 |

FOREIGN PATENT DOCUMENTS

GB   2 342 149 A   5/2000

* cited by examiner

Primary Examiner—Jacques H. Louis-Jacques
(74) Attorney, Agent, or Firm—Fish & Richardson P.C.

(57) ABSTRACT

An automatic automobile headlamp leveling device is provided for a headlamp which is driven by an actuator so that a light axis of the headlamp can be tilted up or down relative to a vehicle body. A vehicle speed detection sensor is provided for detecting the vehicle speed, a pitch angle detection sensor is provided for detecting a pitch angle of the vehicle, a storage section is provided for storing a plurality of pitch angle data of the vehicle detected by the pitch angle detection sensor, and a control section is provided for controlling the driving of the actuators. The control section controls the driving of the actuators based on the pitch angle data so that the light axes of the headlamps always stay in a certain tilted state relative to the surface of a road. The storage section is constructed so as to store a plurality of data ranging from latest pitch angle data to pitch angle data detected a predetermined time period prior to the latest data, and the control section controls the driving of the actuator at certain intervals based when the vehicle is at a stop, and when the vehicle is starting, it controls the driving of the actuators based on pitch angle data detected immediately prior to the start of the vehicle by the vehicle speed sensor.

11 Claims, 3 Drawing Sheets

AUTOMATIC AUTOMOBILE HEADLAMP LEVELING DEVICE

BACKGROUND OF THE INVENTION

1. Technical Field of the Invention

The present invention relates to an automatic automobile headlamp leveling device for automatically adjusting the tilt of headlamps of a vehicle based on a tilt of the vehicle in a longitudinal direction thereof (hereinafter, referred to as pitch angle) in a direction in which the light axes of the headlamps are adjusted so as to offset the tilt of the vehicle (hereinafter, referred to as automatic leveling).

2. Background of the Prior Art

A headlamp of this kind is constructed, for instance, such that a reflector having a light source securely inserted thereinto is supported in such a manner as to be tilted about a horizontal tilting shaft relative to a lamp body and that the light axis of the reflector (headlamp) is tilted by an actuator about the horizontal tilting shaft.

A conventional automatic headlamp leveling device comprises a pitch angle detection means, a vehicle speed sensor and a control section for controlling the driving of actuators based on detection signals from the detection means and sensor, which are mounted on a vehicle for adjusting light axes of the headlamps of the vehicle such that the light axes stay in a certain state relative to the surface of a road at all times.

The conventional automatic headlamp leveling device is, however, constructed such that the leveling of headlamps of a vehicle is performed in real time, whether the vehicle is running or at a stop, in response to a change in vehicle posture. The change in vehicle posture may be caused by the acceleration or deceleration of the vehicle, or a change in load resulting from the loading or unloading of luggage, or when occupants get in or out of the vehicle. This causes the actuator to be activated a large number of times, thereby increasing power consumption; thus, high durability is required for the driving mechanism components, such as motors, gears and the like, and production costs are increased.

To cope with this problem, an automatic headlamp leveling device (Japanese Unexamined Patent Publication No. HEI 10-274859) was proposed with a view to providing an automatic headlamp leveling device that is inexpensive and which has a long service life by reducing the frequency at which the actuators are driven. The proposed automatic headlamp leveling device is constructed so that the driving of the actuators is controlled at certain intervals while the vehicle is at a stop, and when the vehicle is starting, the driving of the actuators is controlled based on latest pitch angle data from when the vehicle was at a stop (pitch angle data detected immediately prior to the start of the vehicle)

There is a drawback with the proposed automatic headlamp leveling device, however, in that the control of the driving of the actuators when the vehicle is starting is not performed accurately enough so that a proper automatic leveling is not proivded. This improper automatic headlamp leveling will be described with reference to FIG. 4.

FIG. 4 shows changes in vehicle speed and vehicle posture from when an accelerator pedal of a vehicle is depressed to start it running until the vehicle reaches a running at a constant speed. As shown therein, a predetermined time period (T) is required from when the accelerator pedal is depressed until the vehicle actually starts to run. In other words, the vehicle speed starts to increase during the predetermined time (T) after the accelerator pedal is depressed. On the other hand, as to the posture of the vehicle, since the acceleration is drastically put in action when the accelerator pedal is depressed, the vehicle hip dives and it restores its initial or normal posture when the vehicle speed becomes constant. Thus, when the vehicle speed sensor detects the start of the vehicle (when the control section detects the start of the vehicle based on an output from the vehicle speed sensor), the vehicle is in a hip dive state (a state in which the front of the vehicle is raised), and therefore, the pitch angle detecting means (a vehicle height sensor) detects a pitch angle of the vehicle, the front of which is being raised, and the leveling of the headlamps is performed such that the light axes of the headlamps are tilted downwardly based on that improper pitch angle.

SUMMARY OF THIS PRESENT INVENTION

The present invention was made in view of the aforesaid problem inherent in the previously proposed devices, and an object thereof is to provide an automatic automobile headlamp leveling device that is inexpensive and which has a long service life by reducing the frequency at which actuators are driven to thereby improve the improper automatic headlamp leveling when a vehicle is starting.

With a view to attaining the aforesaid object, the present invention provides an automatic automobile headlamp leveling device comprising headlamps each adapted to be driven by an actuator such that a light axis thereof is tilted up and/or down relative to a vehicle body, control means for controlling the driving of said actuators, vehicle speed detection means for detecting the vehicle speed, pitch angle detection means for detecting a pitch angle of the vehicle, and a storage section for storing pitch angle data of the vehicle detected by the pitch angle detection means. The control means controls the driving of the actuators based on pitch angle data detected by the pitch angle detection means such that the light axes of the headlamps always stay in a certain tilted state relative to the surface of a road, wherein the storage section is constructed so as to store a plurality of data ranging from latest pitch angle data to pitch angle data detected a predetermined time period prior to the latest data, and wherein the control means judges whether the vehicle is at a stop or is starting based on outputs from the vehicle speed sensors and then controls the driving of said actuator at certain intervals based on the latest pitch angle data when the vehicle is being at a stop. When the vehicle is starting, it controls the driving of the actuator based on pitch angle data detected immediately prior to the start of the vehicle, the automatic automobile headlamp leveling device being characterized in that pitch angle data detected prior to the depression of an accelerator pedal of the vehicle are used as the pitch angle data detected immediately prior to the start of the vehicle which data are to be used for controlling the driving of the actuator when the vehicle is starting.

The pitch angle data when the vehicle is at a stop is less affected by disturbance factors than the pitch angle data when the vehicle is running, and therefore the former is more accurate than the latter to that extent, and since the driving of the actuators are controlled based on these accurate pitch angle data, the automatic headlamp leveling so performed can be accurate to that extent.

In addition, since the controlling of the driving of the actuators is limited to an interval of a certain time period, the frequency at which the actuators are activated can be lowered to that extent, whereby the consumption of electric power can be saved and the wear of the driving mechanism components can also be reduced.

Furthermore, when the start of the vehicle is detected by the vehicle speed sensor, the actuators are driven based on accurate pitch angle data taken immediately prior to the start of the vehicle (when the vehicle is at a stop), whereby a proper automatic headlamp leveling can be performed.

To describe this in detail with reference to FIG. 4, pitch angle data detected within the time period T from when the accelerator pedal is depressed until the vehicle speed sensor detects the start of the vehicle are not necessarily proper since the vehicle hip dives. Thus, an automatic headlamp leveling is performed based on the latest pitch angle data which was detected immediately prior to the start of the vehicle when it was at a stop by using pitch angle data detected prior to that time period T (pitch angle data detected within a time period indicated by reference character A in FIG. 4), whereby an improper automatic headlamp leveling immediately after the start of the vehicle can be avoided.

The present invention provides an automatic automobile headlamp leveling device, wherein pitch angle data detected a predetermined time period prior to the detection of the start of the vehicle by the vehicle speed sensor while the vehicle is at a stop are used as the pitch angle data detected prior to the depression of the accelerator pedal. In addition, it is desirable to use pitch angle data detected during the predetermined time period which is set within a range from 1 to 3 seconds prior to the detection of the start of the vehicle by the vehicle speed sensor, while the vehicle is at a stop, as the pitch angle data detected prior to the depression of the accelerator pedal.

Although there is a slight difference from vehicle to vehicle, it generally takes 1 to 3 seconds until the vehicle actually starts to run after the accelerator pedal is depressed. In view of this, an automatic automobile headlamp leveling device of the present invention has the pitch angle data stored in the storage section replaced sequentially for data updating in such a manner that oldest pitch angle data are replaced with latest pitch angle data every time new pitch angle data are inputted.

With this construction, the pitch angle data detected during the predetermined time period before can be used at all times, and the capacity of the storage section does not have to be increased particularly.

In addition, in the automatic automobile headlamp leveling device of the present invention, the controlling of the actuator is performed provided that the headlamps are being turned on.

As long as the headlamps are not turned on, the actuators are not activated, and therefore the number of times when the actuators are activated can be reduced, whereby the consumption of electric power is saved and the wear of constituent members of the driving mechanism is also reduced.

In the automatic automobile headlamp leveling device of the present invention, the actuator driving intervals may be set so as to be longer than a maximum driving time of the actuator required for each leveling operation.

When an interval between a previous control and a control following the same is shorter than the maximum driving time of the actuator, the actuator starts the following operation before a target value is reached, and this increases the frequency at which the actuator is driven, whereby the life of the actuator is reduced. According to the construction of the present invention, however, only after the actuator reaches the target value through a previous control, the actuator is constructed to be driven through a control subsequent thereto, whereby the frequency at which the actuator is driven is reduced, thus increasing the life of the actuator.

Furthermore, since the change in pitch angle within an interval between the previous control to the control following the previous control can be omitted by increasing the interval, those two controls can be omitted without entailing the driving of the actuators. In other words, since all operations within the interval are directed to the driving of the actuators in the following control, the frequency at which the actuators are driven is reduced to that extent.

Moreover, the pitch angle data of the vehicle which are detected by the pitch angle detection means are taken into the control section at all times so that they are calculated as a control amount even during an interval between controls of the driving of the actuators, and all of the pitch angle data taken into the control section are used as control data, whereby so many pitch angles can be used as control data, so that a proper automatic headlamp leveling is made possible which results from the detection of accurate vehicle postures (pitch angles).

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
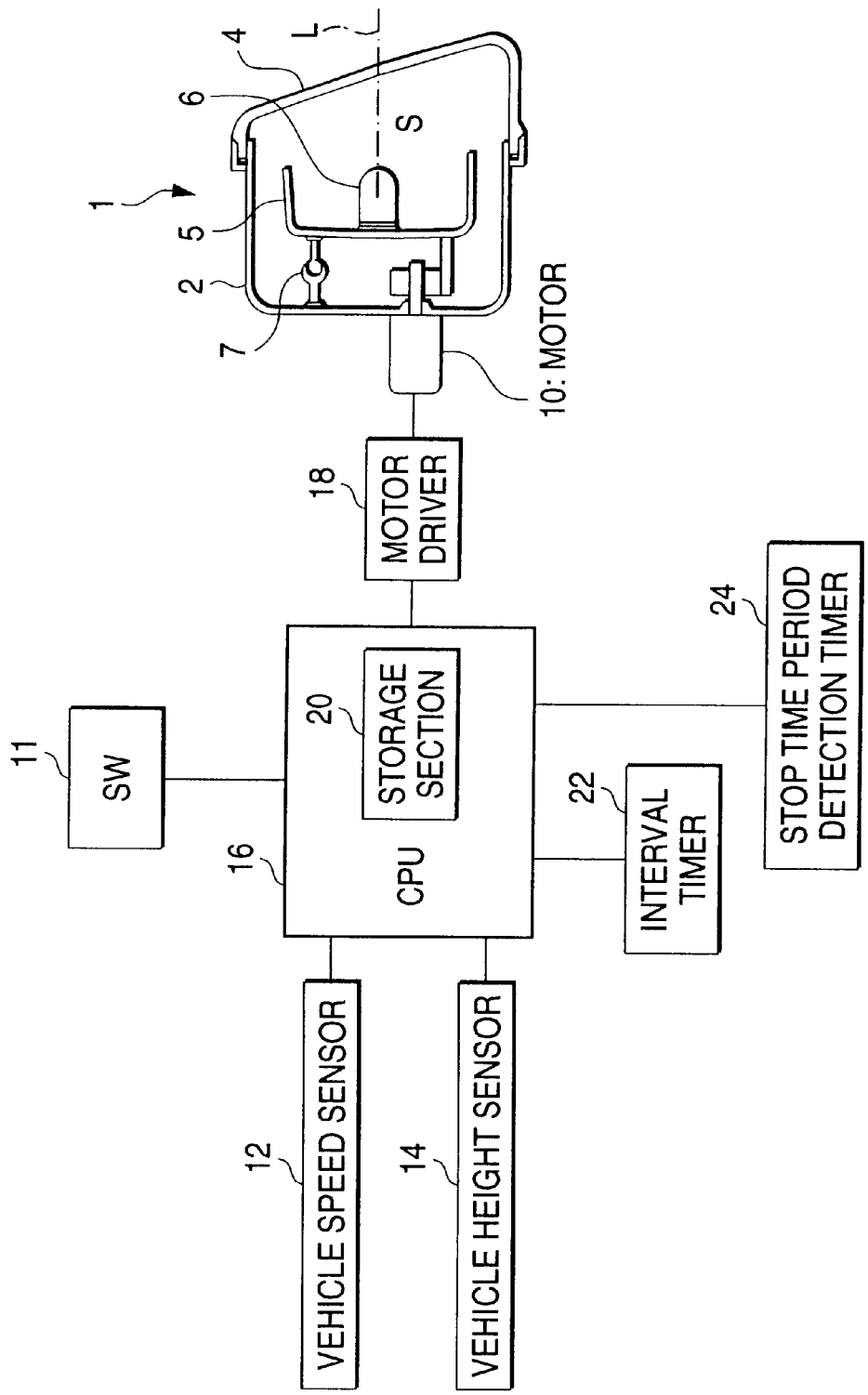
FIG. 1 illustrates a diagram showing the construction of an automatic automobile headlamp leveling device according to a first embodiment of the present invention.
Figure 2:
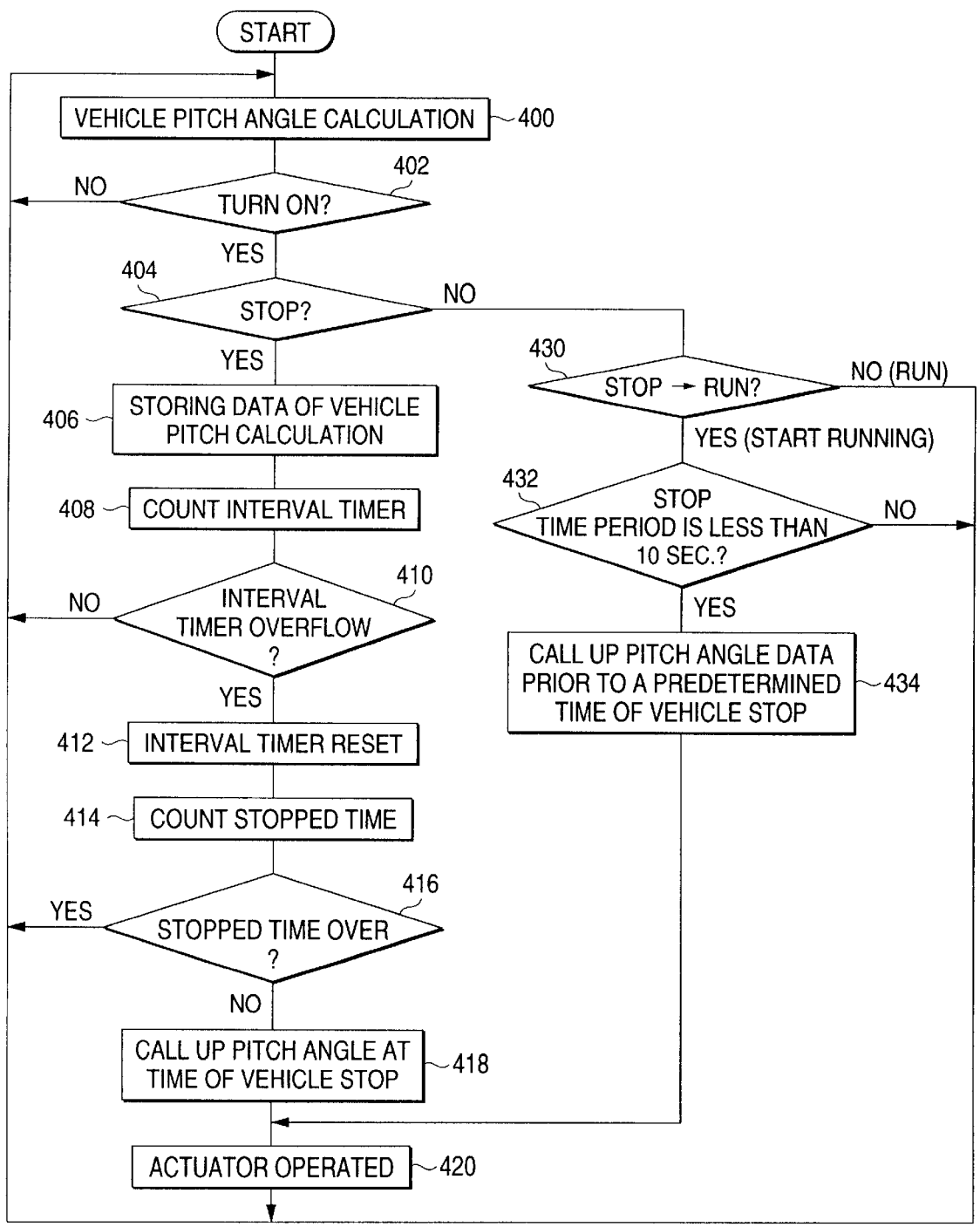
FIG. 2 illustrates a diagram showing a flowchart of a CPU which is a control section of the same device.
Figure 3:
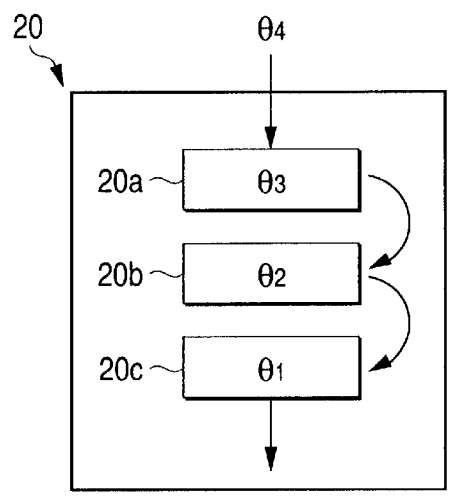
FIG. 3 illustrates a diagram showing a storage section.
Figure 4:
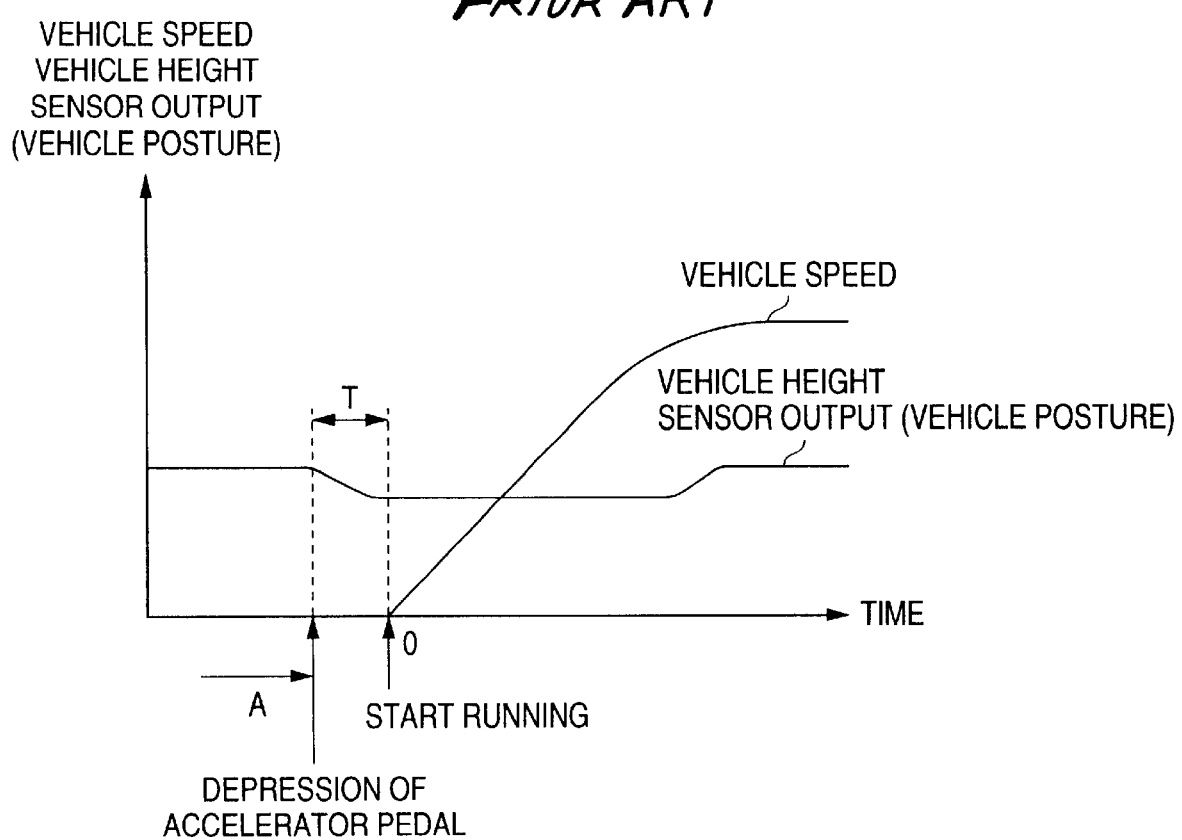
FIG. 4 illustrates a diagram showing changes in vehicle speed and vehicle height sensor output (vehicle posture) from when the vehicle starts running after the accelerator pedal is depressed until the vehicle is running constantly.

A mode of operation of the present invention will be described below with reference to an embodiment thereof FIGS. 1 to 3 show one embodiment of the present invention, in which FIG. 1 is a diagram showing the construction of the entirety of an automatic automobile headlamp leveling according to the first embodiment of the present invention, FIG. 2 a diagram showing a flowchart of steps performed by a CPU which is a control section of the same device, and FIG. 3 is a diagram showing the construction of a storage section.

Reference numeral 1 in FIG. 1 denotes a headlamp for an automobile in which a front lens 4 is assembled to a front opening of a lamp body 2 so as to form a lamp chamber S. In the lamp chamber S, a parabolic reflector 5 having a bulb 6 as a light source inserted thereunto is constructed not only to be supported in such a manner as to be tilted around a horizontal tilting shaft (a shaft perpendicular to the surface of a document on which FIG. 1 is shown) but also to be tilt adjusted by a motor 10 which is an actuator.

The automatic leveling device for the headlamp 1 comprises the motor 10 which is an actuator for tilt adjusting a light axis of the headlamp 1 in vertical directions, a lighting switch 11 for the headlamp 1, a vehicle speed sensor 12 which is a vehicle speed detection means for detecting the speed of a vehicle, a vehicle height sensor 14 constituting a part of a vehicle pitch angle detection means, a CPU 16 which is a control section for judging whether the headlamp 1 is turned on or turned off, judging whether the vehicle is running or being at a stop based on a signal from the vehicle speed sensor 12, calculating a pitch angle of the vehicle based on a signal from the vehicle height sensor 14, and outputting a control signal to a motor driver 18 for driving the motor 10 based on pitch angle data so calculated, a storage section 20 for storing pitch angle data of the vehicle which are detected by the vehicle height sensor 14 and calculated by the CPU 16, an interval timer 22 for setting a timing when the motor 10 is driven, and a timer 24 for detecting a time period during which the vehicle is at a stop.

When a signal is inputted into the CPU 16 from the vehicle speed sensor 12, whether the vehicle is at a stop, is starting or is running, is judged by the CPU 16 based on the input signal. Then, only when the vehicle is at a stop and/or when it is starting, the driving of the actuator 10 is controlled based on predetermined pitch angle data.

In addition, in the CPU 16, when a signal is inputted thereinto from the vehicle height sensor 14, a longitudinal tilt (pitch angle) is calculated from this signal corresponding to a displacement of the suspensions. In a double sensor system in which vehicle height sensors are provided on both front and rear wheels, the pitch angle of the vehicle can be obtained from a displacement between the vehicle heights at the front and rear of the vehicle and the wheel base of the vehicle. In a single sensor system in which a vehicle height sensor is provided on either the front wheel or the rear wheel, the pitch angle of the vehicle can be estimated from a change in the vehicle height. The CPU 16 outputs a signal to the motor driver 18 for tilting the light axis L a predetermined amount in a direction in which a detected pitch angle is cancelled.

In addition, the storage section 20 is a section for storing pitch angle data detected by the vehicle speed sensor 12 and calculated by the CPU 16 and, as shown in FIG. 3, comprises first to third storing portions 20a, 20b, 20c for storing a plurality (for instance, three (3)) of data θ1, θ2, θ3, that is, the latest pitch angle data θ3 to pitch angle data θ1 detected a predetermined time before. When latest pitch angle data θ4 are inputted into the storage section 20 via the CPU 16, the data θ1 stored in the third storing portion 20c is deleted, the data θ2 stored in the second storing portion 20b is shifted to the third storing portion 20c, the data θ3 stored in the first storing portion 20a is shifted to the second storing portion 20b, and the latest data θ4 is then stored in the now vacant first storing portion 20a. In this way, in those storing portions 20a, 20b, 20c, data are designed to be rewritten sequentially from older data to newer data.

The CPU 16 controls the driving of the actuator based on the latest pitch angle stored in the storage section 20 (the data stored in the first storing portion 20a) while the vehicle is at a stop, and controls the driving of the actuator based on the pitch angle data stored in the third storing portion 20c of the storage section 20.

In addition, the CPU 16 judges whether the lighting switch 11 is turned on or off and outputs a signal to the motor driver 18 for driving the motor 10 only when the lighting switch 11 is turned on.

Furthermore, the CPU 16 outputs a signal to the motor driver 18 for driving the motor 10 only when a predetermined interval time set in the interval timer 22 has elapsed.

The tiltable range of the light axis of the headlamp 1 is predetermined, and therefore a maximum driving time of the motor 10 required for each leveling operation is also predetermined. When an interval (time) between motor drivings is shorter than the maximum driving time of the motor 10 required for each leveling, the motor 10 is frequently driven to follow changes in the vehicle posture (pitch angle) resulting every time an occupant gets in or out of the vehicle and so forth, and therefore the motor 10 is caused to rotate forward or backward or to stop in a repeated fashion before the light axis L (the motor 10) reaches a target position. This leads to an undesirable reduction of the life of the motor 10.

Thus, according to the present invention, a target position for the light axis is constructed so as not to vary during a leveling operation by setting an interval between drivings of the motor longer than the maximum driving time of the motor 10 required for each leveling (for instance, ten (10) seconds).

Moreover, the timer 24 for detecting a time when the vehicle is at a stop, or the stop time period detection timer, is connected to the CPU 16, and when there is no signal inputted into the CPU 16 from the vehicle sensor 12 over a predetermined time period (for instance equal to or more than five (5) minutes) while the vehicle is at a stop, this time period is measured by the stopped time period detection timer 24, and then the driving control of the motor 10 is stopped, whereby a meaningless driving of the motor 10 is avoided. Then, a signal is inputted into the CPU 16 from the vehicle speed sensor 12 during this state in which the motor driving control is stopped, the motor 10 is controlled to resume its operation.

Next, according to the flowchart shown in FIG. 2, the control of the driving of the motor 10 by the CPU 16, which is the control section, will be described.

First, in Step 400, the pitch angle of the vehicle is calculated by the CPU 16 based on a signal from the vehicle height sensor 14. Further, in Step 402, whether the headlamp is turned on or off is judged, and when NO is judged (that is, the headlamp is turned off), the flowchart returns to Step 400, while when YES is judged (the headlamp is turned on), the flowchart moves to Step 404, where whether the vehicle is at a stop or is running is judged.

In Step 404, if YES (that is, the vehicle is at a stop), the flowchart moves to Step 406 where the pitch angle data (the pitch angle data when the vehicle is at a stop) detected at Step 400 are stored in the storage section 20. In the storage section 20, in a case where there are pitch angle data that have been stored before, those old data stored therein are sequentially replaced with new data for storage, and thus, the latest data are stored in the storage section 20, the flowchart then moving to Step 408. In Step 408, the interval timer 22 is counted and in Step 410, whether or not the interval time (ten seconds) has elapsed is judged. When NO is judged (that is, when 10 seconds have not elapsed), the flowchart returns to Step 400, while when YES is judged (when ten seconds have elapsed), in Step 412, the interval timer 22 is reset and the flowchart moves to Step 414.

In Step 414, the stopped time period detection timer 24 is counted, and in Step 416, whether a predetermined time period (for instance, five (5) minutes) has elapsed or not is judged. When NO (that is, five (5) minutes have not elapsed), the flowchart moves to Step 418, and the latest pitch angle data stored in the storage section 20 is called. Then, the flowchart moves to Step 420 where an output is given to the motor driver 18 to control the motor 10 and then moves back to Step 400. On the other hand, in Step 416, when YES (that is, five (5) minutes have elapsed), the flowchart returns to Step 400 without controlling the driving of the motor 10).

Moreover, in Step 404, in a case where a negative judgement, NO, is made (that is, it is judged that the vehicle is running), the flowchart moves to Step 430, and it is judged whether the vehicle moves from a stopped state to a starting state or it is running. In other words, in Step 430, whether or not the vehicle starts running from the stopped state is judged under this routine based on an output from the vehicle speed sensor 12. When YES (when the vehicle moves from the stopped state to the running state, in other words, the vehicle starts running), the flowchart moves to Step 432. In Step 432, whether or not the stopped time period is less than ten seconds is judged by the stopped time period detection timer 24, and when the stopped time period is less than ten seconds, the flowchart moves to Step 434. In this step 434, pitch angle data stored in the storage section (pitch angle data stored in the third storing portion 20c of the storage section 20) which is detected 2 to 3 seconds prior to the detection of the start of the vehicle while the vehicle is at a stop is called up. Then, in Step 420, an output is sent to the motor driver 18 for driving the motor 10 based on the pitch angle data detected 2 to 3 seconds prior to the detection of the start of the vehicle, and the flowchart returns to Step 400. The motor 10 is driven by an amount corresponding to the pitch angle data detected under a stable state while the vehicle is at a stop before the accelerator pedal is depressed, whereby the headlamp is leveled.

On the other hand, in Step 430, when NO is judged (when the vehicle does not move from the stopped state to the running state, that is, when the vehicle is kept running), the motor does not need to be driven, and the flowchart returns to Step 400.

In addition, in Step 432, in a case where the stopped time period exceeds ten seconds, this is a state in which the interval time (ten seconds) of the actuator has elapsed, and since a leveling has surely been carried out in Step 420, there is no need to carry out a re-leveling, and the flowchart returns to Step 400. Namely, ten seconds in Step 432 is equal to the interval time (ten seconds) of the actuator. In a case where 10 seconds have elapsed since the vehicle is brought to a stop, since the leveling (correction of the light axis) has surely been carried out based on the pitch angle data when the vehicle is at a stop in Step 420, a leveling is carried out in Step 434 based on optimum pitch angle data while the vehicle is at a stop only in a case where there is a risk of no leveling having been carried out when the vehicle is at a stop (only in a case where ten seconds have not elapsed since the vehicle is brought to a stop), whereby the number of times when the actuator is activated is designed to be reduced.

Furthermore, in the aforesaid embodiment, the interval (time) of the actuator 10 is described as being ten seconds, but this may be set arbitrarily relative to the maximum driving time of the actuator.

In addition, in the above embodiment, only when the stopped time period is judged as being less than ten seconds in Step 432, is a leveling designed to be carried out in Step 420, but the flowchart may move directly to Step 434 from Step 430 without provision of Step 432.

Moreover, in the aforesaid embodiment, an automatic headlamp leveling is described with respect to a movable reflector type headlamp in which the reflector 5 is provided in such a manner as to be tilted relative to the lamp body 2 fixed to the vehicle body, but the present invention may be applied to an automatic headlamp leveling of a unit type headlamp in which a lamp body reflector unit is provided in such a manner as to be tilted relative to a lamp housing fixed to the vehicle body.

As is clear from the aforesaid description, according to the automatic automobile headlamp leveling device, the driving of the actuator through automatic leveling while the vehicle is at a stop is limited to the predetermined time period for each leveling. Therefore, the number of times when the actuator is activated can be reduced, whereby the consumption of electric power is saved and the wear of the driving mechanism constituent members is reduced, thereby making it possible to provide an automatic headlamp leveling device that is inexpensive and which operates accurately.

In addition, the actuator is activated based on the accurate pitch angle data from immediately prior to the start of the vehicle while it is at a stop, and therefore a proper automatic headlamp leveling can be performed even when the vehicle is starting.

The driving of the actuator is positively controlled based on the latest pitch angle while the vehicle is at a stop and also when it is starting, thus, a proper automatic headlamp leveling becomes possible both when the vehicle is at a stop and when it is starting.

Pitch angle data which are detected a predetermined time period before can be removed, so that there is no need to increase the capacity of the storage section in particular, and thus the automatic headlamp leveling device can be constructed simply and inexpensively.

The actuator is not driven as long as the headlamp is not turned on, and therefore, the number of times when the actuator is activated is reduced, whereby the consumption of electric power is saved and the wear of the driving mechanism constituent members is reduced, thereby making it possible to provide an automatic headlamp leveling device that is inexpensive and which operates accurately for a long time.

The frequency at which the actuator is driven is low, thereby making it possible to provide an automatic headlamp leveling device which can operate accurately for a long time.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An automatic automobile headlamp leveling device, comprising:

at least one headlamp, each adapted to be driven by an actuator such that a light axis thereof is tilted up and/or down relative to a vehicle body;

control means for controlling the driving of said actuator;

vehicle speed detection means for detecting a speed of the vehicle;

pitch angle detection means for detecting a pitch angle of the vehicle; and a storage section for storing pitch angle data of the vehicle detected by said pitch angle detection means, wherein said control means controls the driving of said actuator based on pitch angle data detected by said pitch angle detection means so that the light axis of said at least one headlamp stays in a certain tilted state relative to the surface of a road, wherein said storage section stores a plurality of data ranging from latest pitch angle data to pitch angle data detected a predetermined time period prior to said latest data, wherein said control means judges whether the vehicle is at a stop or is starting based on outputs from said vehicle speed sensors and then controls the driving of said actuator at certain intervals based on the latest pitch angle data when the vehicle is at a stop, and it controls the driving of said actuator based on pitch angle data detected prior to the start of movement of the vehicle from its stopped position when the vehicle is starting, and wherein pitch angle data detected a predetermined time period prior to the detection of the start of the vehicle by the vehicle speed sensors is used as the pitch angle data detected prior to the start of the vehicle, and subsequently used for controlling the driving of said actuator while the vehicle is starting.

2. An automatic automobile headlamp leveling device as set forth in claim 1, wherein said predetermined time period is set within a range from 1 to 3 seconds.

3. An automatic automobile headlamp leveling device as set forth in claim 2, wherein pitch angle data stored in said storage section are replaced sequentially for data updating in such a manner that oldest pitch angle data are replaced with latest pitch angle data every time latest pitch angle data are inputted.

4. An automatic automobile headlamp leveling device as set forth in claim 2, wherein controlling of said actuator is performed provided that the headlamps are turned on.

5. An automatic automobile headlamp leveling device as set forth in claim 2, wherein said actuator driving intervals are set so as to be longer than a maximum driving time of said actuator that is required for each leveling operation.

6. An automatic automobile headlamp leveling device as set forth in claim 1, wherein pitch angle data stored in said storage section are replaced sequentially for data updating in such a manner that oldest pitch angle data are replaced with latest pitch angle data every time latest pitch angle data are inputted.

7. An automatic automobile headlamp leveling device as set forth in claim 1, wherein controlling of said actuator is performed provided that the headlamps are turned on.

8. An automatic automobile headlamp leveling device as set forth in claim 1, wherein said actuator driving intervals are set so as to be longer than a maximum driving time of said actuator that is required for each leveling operation.

9. A method for adjusting an automobile headlamp comprising:

storing pitch angle data at predetermined intervals in a memory when the automobile is at a stop;

driving an actuator at predetermined intervals to tilt an automobile headlamp when the automobile is at a stop, the driving based on the latest pitch angle data;

determining when the automobile is starting to move from a stop condition; and driving the actuator when the vehicle is starting based on the pitch angle data detected a predetermined time period prior to the detection of the start of the vehicle.

10. The method of claim 9 further comprising sequentially replacing the pitch angle data in the memory.

11. The method of claim 9 wherein the driving intervals are longer than a maximum driving time of an actuator required for a leveling operation.

* * * * *